(12) United States Patent
Li et al.

(10) Patent No.: US 9,264,852 B2
(45) Date of Patent: Feb. 16, 2016

(54) METHOD AND SYSTEM FOR DISPLAYING A MESSAGE, AND TERMINAL AND SERVER THEREOF

(71) Applicant: TENCENT TECHNOLOGY (SHENZHEN) COMPANY LIMITED, Shenzhen (CN)

(72) Inventors: Xinzhu Li, Shenzhen (CN); Qing Yang, Shenzhen (CN)

(73) Assignee: TENCENT TECHNOLOGY (SHENZHEN) COMPANY LIMITED (CN)

( * ) Notice: Subject to any disclaimer, the term of this patent is extended or adjusted under 35 U.S.C. 154(b) by 0 days.

(21) Appl. No.: 14/189,046

(22) Filed: Feb. 25, 2014

(65) Prior Publication Data
US 2014/0171130 A1    Jun. 19, 2014

Related U.S. Application Data

(63) Continuation of application No. PCT/CN2012/080285, filed on Aug. 17, 2012.

(30) Foreign Application Priority Data

Aug. 25, 2011   (CN) .......................... 2011 1 0246611

(51) Int. Cl.
*H04W 24/00* (2009.01)
*H04W 4/02* (2009.01)
(Continued)

(52) U.S. Cl.
CPC ................. *H04W 4/02* (2013.01); *H04L 67/02* (2013.01); *H04W 4/12* (2013.01)

(58) Field of Classification Search
CPC ........... H04W 4/02; H04W 4/12; H04L 67/02

USPC ............................................... 455/456.1, 457
See application file for complete search history.

(56) References Cited

U.S. PATENT DOCUMENTS

2005/0278371 A1* 12/2005 Funk et al. .................... 707/102
2006/0258368 A1* 11/2006 Granito et al. ............. 455/456.1
(Continued)

FOREIGN PATENT DOCUMENTS

| CN | 101299769 A | 11/2008 |
|----|-------------|---------|
| CN | 102147903 A | 8/2011 |
| WO | 2008037401 A1 | 4/2008 |

OTHER PUBLICATIONS

International Search Report issued Nov. 22, 2012 re: PCT/CN2012/080285.

(Continued)

*Primary Examiner* — Charles Shedrick
(74) *Attorney, Agent, or Firm* — Cantor Colburn LLP

(57) ABSTRACT

Examples of the present disclosure provide a method for displaying a message, in which a terminal receives a message posted by a user, obtains LBS information of the user, sends to a server the LBS information and the received message; the server stores the message received and the LBS information associated with the message, for each message stored, when a request for viewing the message is received from the user, the server displays, through the terminal, the message and the LBS information associated with the message to the user. Various examples of the present disclosure also provide a system for displaying a message, a terminal and a server thereof. When the method, system, and apparatuses provided by the examples of the present disclosure are employed, other users can exactly know a geographical location where the user is in when the user posted the message.

8 Claims, 3 Drawing Sheets

(51) Int. Cl.
*H04L 29/08* (2006.01)
*H04W 4/12* (2009.01)

(56) References Cited

U.S. PATENT DOCUMENTS

2007/0161382 A1* 7/2007 Melinger et al. ........... 455/456.1
2008/0280598 A1* 11/2008 Delegue et al. ............ 455/414.1
2010/0325194 A1* 12/2010 Williamson et al. .......... 709/203
2011/0035284 A1* 2/2011 Moshfeghi ................. 705/14.58
2011/0047463 A1* 2/2011 Shepherd et al. ............. 715/723

OTHER PUBLICATIONS

International Report on Patentability and Written Opinion issued Mar. 6, 2014 re: Application No. PCT/CN2012/080285.

* cited by examiner

METHOD AND SYSTEM FOR DISPLAYING A MESSAGE, AND TERMINAL AND SERVER THEREOF

CROSS-REFERENCE TO RELATED APPLICATIONS

This application is a continuation of International Application No. PCT/CN2012/080285, filed on Jul. 19, 2012. This application claims the benefit and priority of Chinese Patent Application No. 201110246611.0, filed on Aug. 25, 2011. The entire disclosures of each of the above applications are incorporated herein by reference.

FIELD OF THE INVENTION

The present disclosure relates to Internet technologies, and more particularly, to a method and a system for displaying a message, and a terminal and a server thereof.

BACKGROUND OF THE INVENTION

Currently, microblog has become an important means for exchanging information among people.

In practice, a user may have a demand that when the user views a microblog of a person, e.g., a buddy of the user, the user may want to know a geographical location where the buddy is in currently, so as to obtain the latest development of the buddy. For example, if it is known through the microblog that the buddy is in Beijing yesterday, but today is in Shanghai, then it may be inferred that the buddy may have a business trip.

In the prior art, another person cannot know a geographical location where the user is in through a microblog message posted by the user unless the user indicates the geographical location in the microblog message, in other words, the prior art cannot satisfy the demand of the user described above.

SUMMARY OF THE INVENTION

In one aspect of the present disclosure, a method for displaying a message is provided, including:

receiving, by a server from a terminal, a message and Location Based Service (LBS) information associated with the message, and storing the message and the LBS information associated with the message; and, when receiving from a user of the terminal a request for viewing the message, displaying, through the terminal, the message and the LBS information associated with the message to the user.

In another aspect of the present disclosure, a method for displaying a message is provided, including:

receiving, by a terminal, a first message posted by a user;

obtaining, by the terminal, Location Based Service (LBS) information of the user associated with the first message, sending, by the terminal to a server, the first message and the LBS information associated with the first message;

receiving, from the server, a second message and LBS information associated with the second message; and, displaying the second message and the LBS information associated with the second message to the user.

In another aspect of the present disclosure, a server is provided, including:

a processing module, to receive, from a terminal, a message and Location Based Service (LBS) information associated with the message, and store the message and the LBS information associated with the message; and, a displaying module, to display, when receiving from a user of the terminal a request for viewing the message, the message and the LBS information associated with the message to the user through the terminal.

In another aspect of the present disclosure, a terminal is provided, including:

an obtaining module, to receive a first message posted by a user, obtain Location Based Service (LBS) information of the user associated with the first message, and send to a server the first message and the LBS information associated with the first message; and, a displaying module, to receive from the server a second message and LBS information associated with the second message, and display the second message and the LBS information associated with the second message to the user.

BRIEF DESCRIPTION OF DRAWINGS

Hereinafter, exemplary examples of the present disclosure will be described in further detail with reference to accompanying drawings, in which.

DETAILED DESCRIPTION OF THE INVENTION

In view of the deficiency of the prior art, examples of the present disclosure provide a method for displaying a message.

Figure 1:
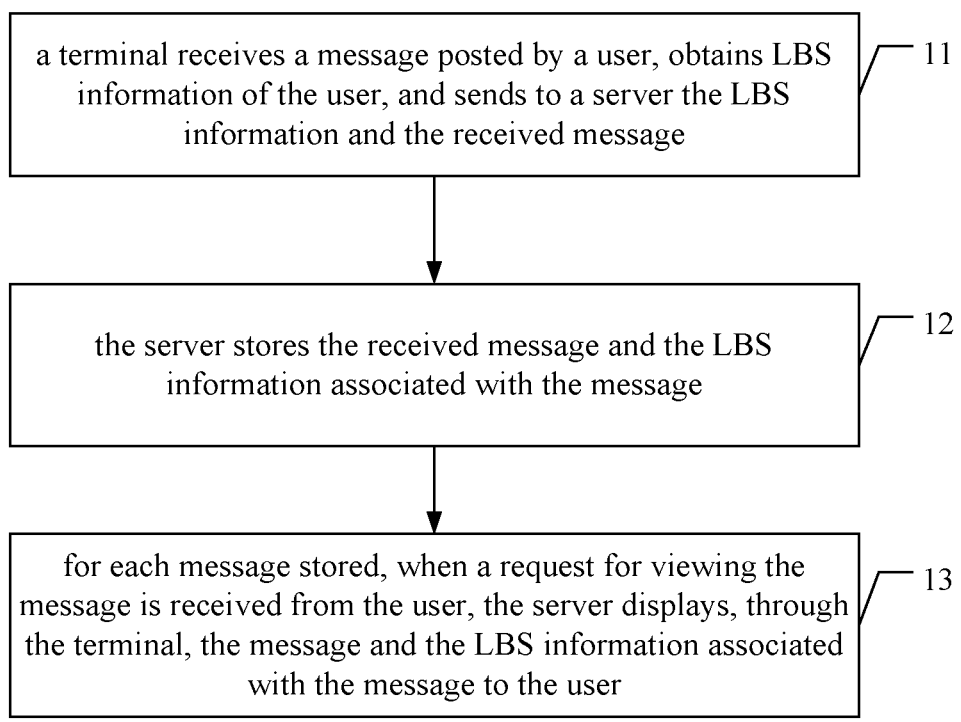
FIG. 1 is a flowchart illustrating a method for displaying a message in accordance with an example of the present disclosure.

FIG. 1 is a flowchart illustrating a method for displaying a message in accordance with an example of the present disclosure. As shown in FIG. 1, the method may include processes as follows.

In block 11, a terminal receives a message posted by a user, obtains Location Based Service (LBS) information of the user, and sends to a server the LBS information and the received message.

The message may be various messages posted by the user, such as a microblog message.

Theoretically, the terminal may obtain, after receiving the message posted by the user, the LBS information of the user (i.e., LBS information of the terminal). However, considering that the user may not want other persons to know the LBS information of the user for privacy considerations, the terminal may query, after receiving the message posted by the user, the user whether it is allowable to add the LBS information to the message. If an approval instruction is received, the terminal obtains the LBS information of the user, and sends to the server the LBS information of the user and the received message. If a denial instruction is received, the terminal sends the received message to the server.

In the example of the present disclosure, the terminal may have a capability of obtaining the LBS information, and how to obtain may refer to the prior art.

The LBS information may include description of a geographical location, a coordinate of the geographical location with latitude and longitude, etc., wherein the description of the geographical location may be contents like Road District, Beijing, and so forth.

In block 12, the server stores the received message and the LBS information associated with the message.

In block 13, for each message stored, when a request for viewing the message is received from the user, the server displays, through the terminal, the message and the LBS information associated with the message to the user.

If the server receives the message, but does not receive the LBS information associated with the message, when the request for viewing the message is received from the user, the server may display the message to the user through the terminal.

In practice, the server as described above may include two servers, i.e., a first server and a second server. One is configured to store the message, and another is configured to store the LBS information. Advantages of such processing may be that if there is only one server, i.e., the message and the LBS information are stored in the same server, once the server is failed, such as the access of the LBS information is failed, the terminal cannot receive any information, but if the message and the LBS information are separately stored, even if the second server is failed, i.e., the access of the LBS information is failed, the terminal can still receive the message sent from the first server.

Hereinafter, the present disclosure will be described in further detail with reference to various exemplary examples.

Figure 2:
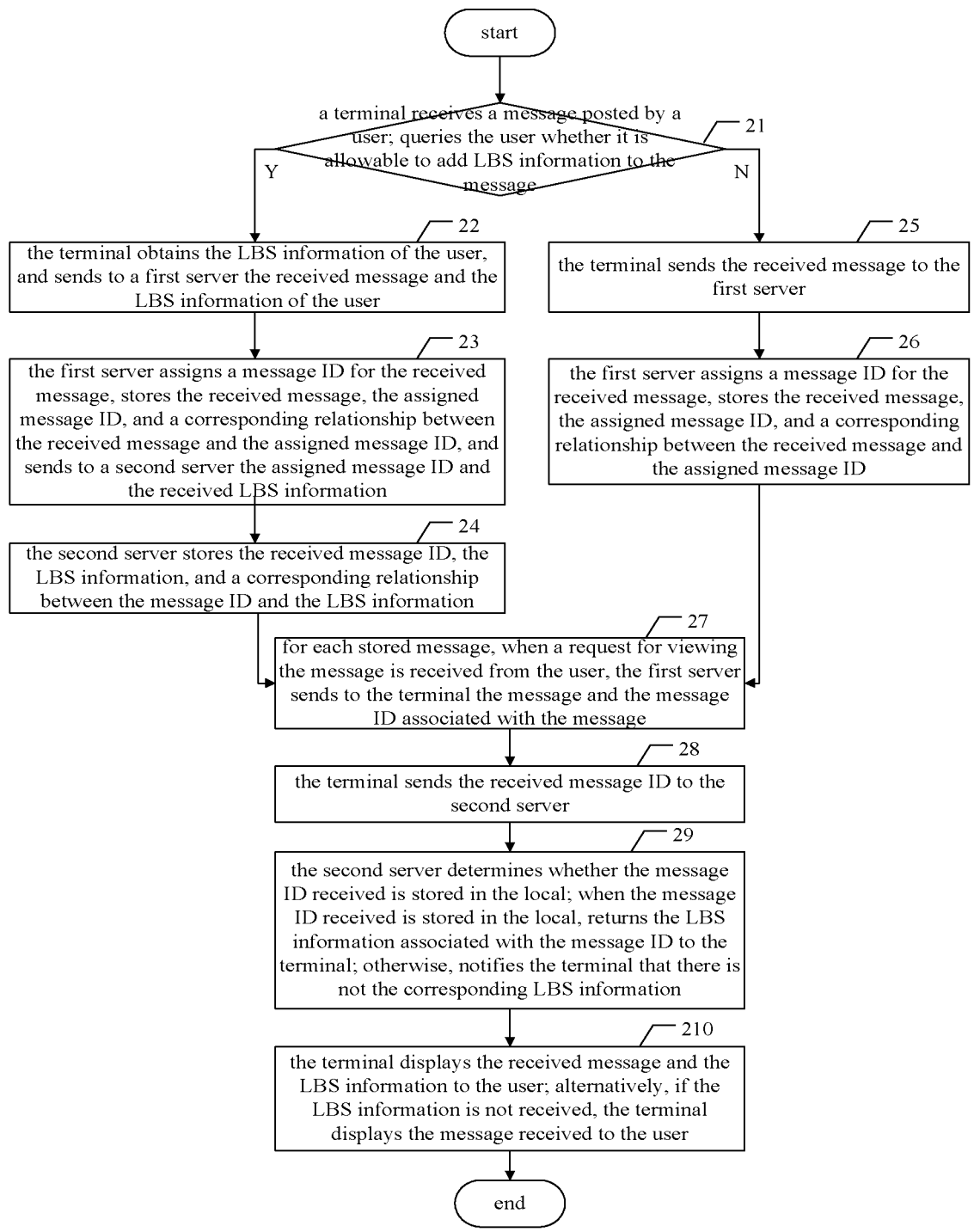
FIG. 2 is a flowchart illustrating a method for displaying a message in accordance with an example of the present disclosure.

FIG. 2 is a flowchart illustrating a method for displaying a message in accordance with an example of the present disclosure. As shown in FIG. 2, the method may include processes as follows.

In block 21, a terminal receives a message posted by a user; queries the user whether it is allowable to add LBS information to the message; if it is allowable, i.e., an approval instruction is received, a process in block 22 is performed, otherwise, a process in block 25 is performed.

In block 22, the terminal obtains the LBS information of the user, and sends to a first server the received message and the LBS information of the user.

In block 23, the first server assigns a message ID for the received message, stores the received message, the assigned message ID, and a corresponding relationship between the received message and the assigned message ID in a storage medium, and sends to a second server the assigned message ID and the received LBS information.

In this case, a message ID of each message is unique.

In block 24, the second server stores the received message ID, the LBS information, and a corresponding relationship between the message ID and the LBS information in a storage medium, then a process in block 27 is performed.

In block 25, the terminal sends the received message to the first server.

In block 26, the first server assigns a message ID for the received message, stores the received message, the assigned message ID, and a corresponding relationship between the received message and the assigned message ID, and the process in block 27 is performed.

In block 27, for each stored message, when a request for viewing the message is received from the user, the first server sends to the terminal the message and the message ID associated with the message.

In block 28, the terminal sends the received message ID to the second server.

In block 29, the second server determines whether the message ID received is stored in the local; in response to determining that the message ID received is stored in the local, returns the LBS information associated with the message ID to the terminal, otherwise, notifies the terminal that there is not the corresponding LBS information.

In block 210, the terminal displays the received message and the LBS information to the user; alternatively, if the LBS information is not received, the terminal displays the message received to the user, and the current process is ended.

In practice, if the user loges in a microblog of a buddy to view messages posted by the buddy, the first server may combine N pieces of message recently posted by the buddy, such as 10 pieces of message, to form a message list, and return the message list to the terminal. The message list may include each piece of message and a message ID associated with each piece of message. In this case, each message ID included in the message list may be processed according to the processes from block 28 to block 210.

How to display the LBS information is not limited in examples of the present disclosure.

When the technical solution provided by the method examples described above is employed, the user may provide the LBS information of the user when the user posts a message, the LBS information and the message are stored in a server. Subsequently, when another user views the message, the server may provide both the message and the LBS information associated with the message to the other user, so that the other user can exactly know a geographical location where the user is in when the user posted the message.

Figure 3:
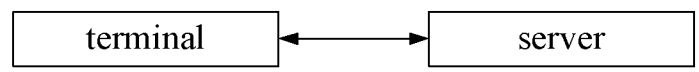
FIG. 3 is a schematic diagram illustrating a structure of a system for displaying a message in accordance with an example of the present disclosure.

Based on the above description, FIG. 3 is a schematic diagram illustrating a structure of a system for displaying a message in accordance with an example of the present disclosure. As shown in FIG. 3, the system may include:

a terminal (usually there are a plurality of terminals, in order to simplify the drawing, FIG. 3 displays only one terminal), configured to receive a message posted by a user, obtain LBS information of the user, and send to a server the received message and the obtained LBS information associated with the message; and, the server, configured to store the received message and the LBS information associated with the received message; for each message stored, when receiving a request for viewing the message, display, through the terminal, the message and the LBS information associated with the message to the user.

In this case, the terminal may be further configured to query, after receiving the message posted by the user, the user whether it is allowable to add the LBS information to the message; if an approval instruction is received, obtain the LBS information of the user; if a denial instruction is received, send the received message to the server, so that the server may store the received message, and when a request for viewing the message is received from the user, display the message to the user through the terminal.

In the example of the present disclosure, the terminal may include:

an obtaining module, configured to receive the message posted by the user, obtain the LBS information of the user, and send to the server the received message and the obtained LBS information associated with the message; wherein the server may store a plurality of messages; and, a displaying module, configured to display the message and the LBS information associated with the message that are received from the server to the user.

In this case, the server may include a first server and a second server. The displaying module may include:

a requesting sub-module, configured to send, for any one message stored in the server, a request for viewing the message to the first server; and, a displaying sub-module, configured to receive the message requested to be viewed and the message ID associated with the message that are returned by the first server, send the received message ID to the second server, receive the LBS information associated with the message ID and returned by the second server, and display the received message and the LBS information associated with the message to the user.

In addition, the obtaining module may be further configured to query, after receiving the message posted by the user, the user whether it is allowable to add the LBS information to the message; if the approval instruction is received, obtain the LBS information of the user, and send to the server the received message and the obtained LBS information; if the denial instruction is received, send the received message to the server.

Figure 4:
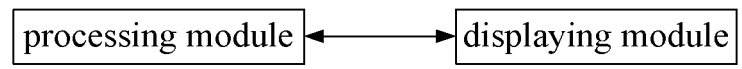
FIG. 4 is a schematic diagram illustrating a structure of a server in accordance with a first example of the present disclosure.

FIG. 4 is a schematic diagram illustrating a structure of a server in accordance with a first example of the present disclosure. As shown in FIG. 4, the server may include:

a processing module, configured to store a message and LBS information corresponding to the message that are received from a terminal; and, a displaying module, configured to display, for each message stored in the server and when a request for viewing the message is received from a user, the message and the LBS information corresponding to the message to the use through the terminal.

In this case, the processing module may include:

a first processing sub-module, configured to assign a message ID for the message received, store the received message and the assigned message ID corresponding to the message, and send to a second processing sub-module the assigned message ID corresponding to the message and the received LBS information associated with the message and the message ID of the message; and, the second processing sub-module, configured to store the received message ID and the LBS information associated with the message ID.

In order to simplify the drawing, the first processing sub-module and the second processing sub-module are not shown in FIG. 4.

For each message stored, when the request for viewing the message is received from the user, the displaying module may obtain, from the first processing sub-module, the message and the message ID corresponding to the message; send the message and the message ID to the terminal of the user; receive the message ID corresponding to the message returned from the terminal; obtain, from the second processing sub-module, the LBS information associated with the message ID; and return the LBS information to the terminal.

When the message is received from the terminal but the LBS information associated with the message is not received, the first processing sub-module may be further configured to store the message. Accordingly, for any message of which LBS information is not stored, when a request for viewing the message is received from the user, the displaying module may be further configured to return the message to the terminal of the user.

Figure 5:
FIG. 5 is a schematic diagram illustrating a structure of a server in accordance with a second example of the present disclosure.

FIG. 5 is a schematic diagram illustrating a structure of a server in accordance with a second example of the present disclosure. As shown in FIG. 5, the server may include:

a first server, configured to assign a message ID for a received message, store the received message and the assigned message ID of the received message, and send to a second server the assigned message ID of the message and the received LBS information associated with the message and the message ID of the message; for each piece of message stored, when receiving from the user a request for viewing the message, send the message and the message ID corresponding to the message to a terminal of the user; and, the second server, configured to store the received message ID and the LBS information associated with the message ID; find, according to the message ID received from the terminal, the LBS information associated with the message ID, and return the LBS information to the terminal.

In this case, when the message is received from the terminal but the LBS information corresponding to the message is not received, the first server may be further configured to store the message, and return, when receiving from the user a request for viewing the message, the message to the terminal of the user.

Specific working processes of the system and apparatus examples described above may refer to the description of the foregoing method examples, which are not repeated herein.

When the technical solution provided by the above system and apparatus examples is employed, the user may provide the LBS information of the user when the user posts a message, the LBS information and the message are stored in a server. Subsequently, when another user views the message, the server may provide both the message and the LBS information corresponding to the message to the other user, so that the other user can exactly know a geographical location where the user is in when the user posted the message.

The above are several examples of the present disclosure, and are not used for limiting the protection scope of the present disclosure. Any modifications, equivalents, improvements, etc., made under the principle of the present disclosure should be included in the protection scope of the present disclosure.

The invention claimed is:

1. A method for displaying a message, comprising:
receiving, by a server from a terminal, a message and Location Based Service (LBS) information associated with the message, and assigning a message ID for the message;
storing the message and the LBS information associated with the message; and,
when receiving from a user of the terminal a request for viewing the message, displaying, through the terminal, the message and the LBS information associated with the message to the user;
wherein the operation of storing the message and the LBS information associated with the message comprises:
storing the message and the message ID in a first storage medium; and,
storing the message ID, the LBS information, and a corresponding relationship between the message ID and the LBS information in a second storage medium which is different from the first storage medium; and
the operation of displaying the message and the LBS information associated with the message to the user through the terminal comprises:
sending the message and the message ID to the terminal;
receiving the message ID returned from the terminal;
obtaining the LBS information according to the message ID and the corresponding relationship between the message ID and the LBS information; and,
sending the LBS information to the terminal.

2. The method of claim 1, further comprising: if the message is received from the terminal but the LBS information associated with the message is not received, storing the message; and, when receiving from the user the request for viewing the message, returning the message to the terminal.

3. A method for displaying a message, comprising:
receiving, by a terminal, a first message posted by a user;
obtaining, by the terminal, Location Based Service (LBS) information of the user associated with the first message,
sending, by the terminal to a server, the first message and the LBS information associated with the first message;
receiving, from the server, a second message and LBS information associated with the second message; and,
displaying the second message and the LBS information associated with the second message to the user;
wherein the server comprises a first server and a second server,
the operation of receiving from the server the second message and the LBS information associated with the second message, and displaying the second message and the LBS information associated with the second message to the user comprises:
sending to the first server a request for viewing the second message;
receiving, from the first server, the second message and a message ID associated with the second message;
sending to the second server the message ID associated with the second message;
receiving the LBS information associated with the second message returned from the second server; and,
displaying the second message and the LBS information associated with the second message to the user.

4. The method of claim 3, after receiving the first message posted by the user, further comprising:
querying the user whether it is allowable to add the LBS information associated with the first message to the first message;
in response to receiving an approval instruction indicating that it is allowable to add the LBS information associated with the first message to the first message, obtaining the LBS information associated with the first message, and sending to the server the first message and the LBS information associated with the first message; and
in response to receiving a denial instruction indicating that it is not allowable to add the LBS information associated with the first message to the first message, sending the first message to the server.

5. A server, comprising:
a processing module, to receive, from a terminal, a message and Location Based Service (LBS) information associated with the message, and store the message and the LBS information associated with the message; and,
a displaying module, to display, when receiving from a user of the terminal a request for viewing the message, the message and the LBS information associated with the message to the user through the terminal;
wherein the processing module comprises:
a first processing sub-module, to receive the message and the LBS information from the terminal, assign a message ID for the message, store the message and the message ID, and send to a second processing sub-module the message ID and the LBS information; and,
the second processing sub-module, to store the message ID, the LBS information, and a corresponding relationship between the message ID and the LBS information; and
the displaying module is further to, when receiving from the user the request for viewing the message,
obtain, from the first processing sub-module, the message and the message ID;
send the message and the message ID to the terminal;
receive the message ID returned from the terminal;
obtain, from the second processing sub-module, the LBS information according to the message ID and the corresponding relationship between the message ID and the LBS information; and,
send the LBS information to the terminal.

6. The server of claim 5, wherein the first processing sub-module is further to, if the message is received from the terminal but the LBS information associated with the message is not received, store the message; and, the displaying module is further to, when receiving from the user the request for viewing the message, return the message to the terminal.

7. A terminal, comprising:
an obtaining module, to receive a first message posted by a user, obtain Location Based Service (LBS) information of the user associated with the first message, and send to a server the first message and the LBS information associated with the first message; and,
a displaying module, to receive from the server a second message and LBS information associated with the second message, and display the second message and the LBS information associated with the second message to the user;
wherein the server comprises a first server and a second server;
the displaying module comprises:
a requesting sub-module, to send to the first server a request for viewing the second message; and,
a displaying sub-module, to receive, from the first server, the second message and a message ID associated with the second message, send to the second server the message ID associated with the second message, receive the LBS information associated with the second message returned from the second server, and display the second message and the LBS information associated with the second message to the user.

8. The terminal of claim 7, wherein the obtaining module is further to, after receiving the first message posted by the user, query the user whether it is allowable to add the LBS information associated with the first message to the first message,
in response to receiving an approval instruction indicating that it is allowable to add the LBS information associated with the first message to the first message, obtain the LBS information associated with the first message, and send to the server the first message and the LBS information associated with the first message, and
in response to receiving a denial instruction indicating that it is not allowable to add the LBS information associated with the first message to the first message, send the first message to the server.

* * * * *